Dec. 9, 1930.                N. F. HADLEY                1,784,436
                             PROPELLER SHAFT
                           Filed May 24, 1927

INVENTOR
NEWTON F. HADLEY.
BY
                    ATTORNEY

Patented Dec. 9, 1930

1,784,436

UNITED STATES PATENT OFFICE

NEWTON F. HADLEY, OF BEVERLY HILLS, MICHIGAN, ASSIGNOR TO CHRYSLER CORPORATION, OF HIGHLAND PARK, MICHIGAN, A CORPORATION OF DELAWARE

PROPELLER SHAFT

Application filed May 24, 1927. Serial No. 193,851.

This invention relates to propeller shafts and more particularly to a drive shaft such as is used in motor vehicles.

An object of the invention is to provide a light weight drive shaft having maximum torsional flexibility with sufficient torsional strength in which the beam rigidity is increased to prevent its tendency to whip.

Another object of the invention is to provide an inexpensive construction in which the combination and arrangement of parts permit maximum torsional flexibility and maximum beam rigidity with a minimum weight.

Other objects and advantages of the invention will more fully appear from the following description taken in connection with the accompanying drawings, in which.

The propeller shaft selected for illustrating the embodiment of my invention comprises a tubular member 10 provided at its opposite ends with universal joint connections 12 adapted to be received by driving and driven members. Secured to or carried by the tubular member 10 is a fluted tubular member 14. The fluted tubular member may be welded to either the universal joint connections or the tubular member and the tubular member is preferably secured to the connection 12 by welding. If desired, the fluted tubular member may be pressed over the outer periphery of the tubular member 10.

It is desirable to permit a certain torsional flexibility in the propeller shaft so that sudden acceleration of the driving member will not cause a jerk on the driven member. This may be accomplished by providing a relatively thin walled tubular member but such a member is not usually strong enough to withstand bending or beam strains. If the wall thickness is increased to prevent bending then the shaft is too rigid for torsional flexibility. I have provided a relatively thin walled tubular member thru which the drive is transmitted and have arranged the fluted tubular member to coact with the tubular member to strengthen it against bending. The flutes extend axially of the tube thus providing ribs which may be twisted easily but not easily bent.

Figure 2:
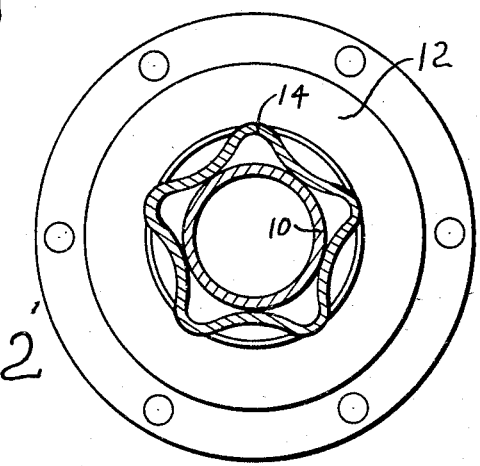
Fig. 2 is a sectional view on line 2—2 of Fig. 1.

Referring to Fig. 2 a five fluted member has been shown which has been found to give very satisfactory results at a minimum expense. The inner points of the flutes engage the wall of the tubular member thru its entire length thereby stiffening it against radial strains.

Figure 1:
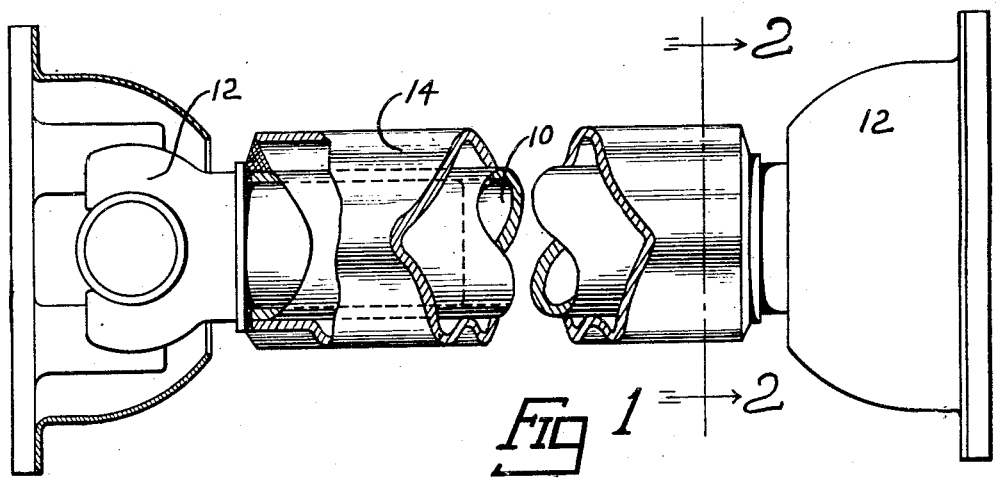
Fig. 1 is a side elevation of a propeller shaft, parts being broken away and parts in section.
Figure 3:
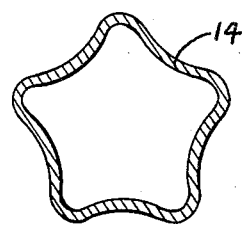
Fig. 3 is a sectional view showing a modified form of the shaft.

It has been found that the fluted tubular member may be directly secured to the universal joint ends and the drive taken therethru without the use of an inner or outer tubular member. Fig. 3 shows such a member in which the wall thickness is light enough to permit torsional flexibility yet due to its increased beam rigidity caused by the ribs or flutes the member has a minimum tendency to whip. In this particular modification, the weight has been reduced over the present type shaft, and its torsional flexibility and beam rigidity have been increased.

Figure 4:
Fig. 4 is a sectional view showing another modification.
Figure 5:
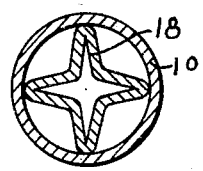
Fig. 5 is a sectional view showing a further modification.

In Fig. 4 cross ribs 16 have been arranged inside the tubular member thruout its length to increase its beam rigidity and in Fig. 5 a fluted member 18 has been shown in place of the cross ribs 16.

Figure 6:
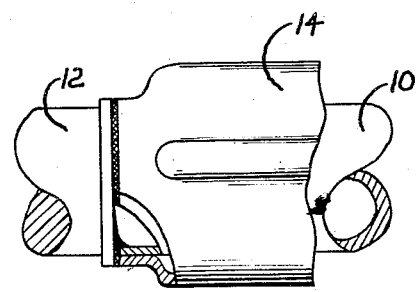
Fig. 6 is a view showing a modification of the method for securing the parts together.

The fluted tube 14 may be secured to the tubular member 10 as by welding and both tubes may be secured to the universal joint by the same welding operation. In Fig. 6 the end of the fluted tube 14 has been shown swaged or drawn to a diameter to fit the entire periphery of the inner tube 10 and welded thereto.

It is to be understood that various changes may be made without departing from the spirit of my invention and it is not my intention to limit its scope other than by the terms of the appended claims.

What I claim is:

1. A propeller shaft of the class described comprising, a tubular member, and a fluted tubular member around said tubular member engaging the outer periphery thereof.

2. A propeller shaft of the class described comprising, a tubular member and a longitudinally fluted tubular member arranged to frictionally engage said tubular member throughout the length of the latter.

3. A propeller shaft of the class described comprising, a tubular member, universal joint ends received in the opposite ends of said tubular member, and a longitudinally fluted member around the outer periphery of said tubular member and frictionally engaging the same.

4. A propeller shaft of the class described comprising, a tubular member, and a five ribbed fluted tubular member around said tubular member engaging the outer periphery of said tubular member.

5. A propeller shaft of the class described comprising, a tubular member having at its opposite ends connections for engaging driving and driven members, and a fluted tubular member frictionally engaging said tubular member throughout the length of said tubular member.

6. A propeller shaft of the class described comprising, a tubular member having connections at its opposite ends for engaging driving and driven members, and a tubular member having longitudinal depressed portions around said tubular member engaging the outer periphery of said tubular member throughout its length.

7. A propeller shaft of the class described comprising, a tubular member and a longitudinally fluted tubular member arranged to co-act with said tubular member, one of said tubular members frictionally engaging the other throughout its length.

8. A propeller shaft of the class described comprising, a tubular member and a longitudinal fluted tubular member arranged to frictionally engaging said tubular member throughout its length, one of said tubular members being within the other.

9. A propeller shaft of the class described comprising a tubular member having longitudinally extending depressed ribs throughout its length, and means at its opposite ends secured to said tubular member for engaging driving and driven members.

10. A propeller shaft comprising a member having longitudinally extending ribs throughout its length, and means for connecting said shaft to driving and driven members including universal joints secured to the opposite ends of said member and to the extremities of said ribs.

NEWTON F. HADLEY.